3,565,869
EXTRUDABLE AND STRETCHABLE POLY-
GLYCOLIC ACID AND PROCESS FOR PRE-
PARING SAME
David Anthony DeProspero, Norwalk, Conn., assignor to
American Cyanamid Company, Stamford, Conn., a cor-
poration of Maine
Filed Dec. 23, 1968, Ser. No. 786,306
Int. Cl. C08g 53/00
U.S. Cl. 260—78.3   9 Claims

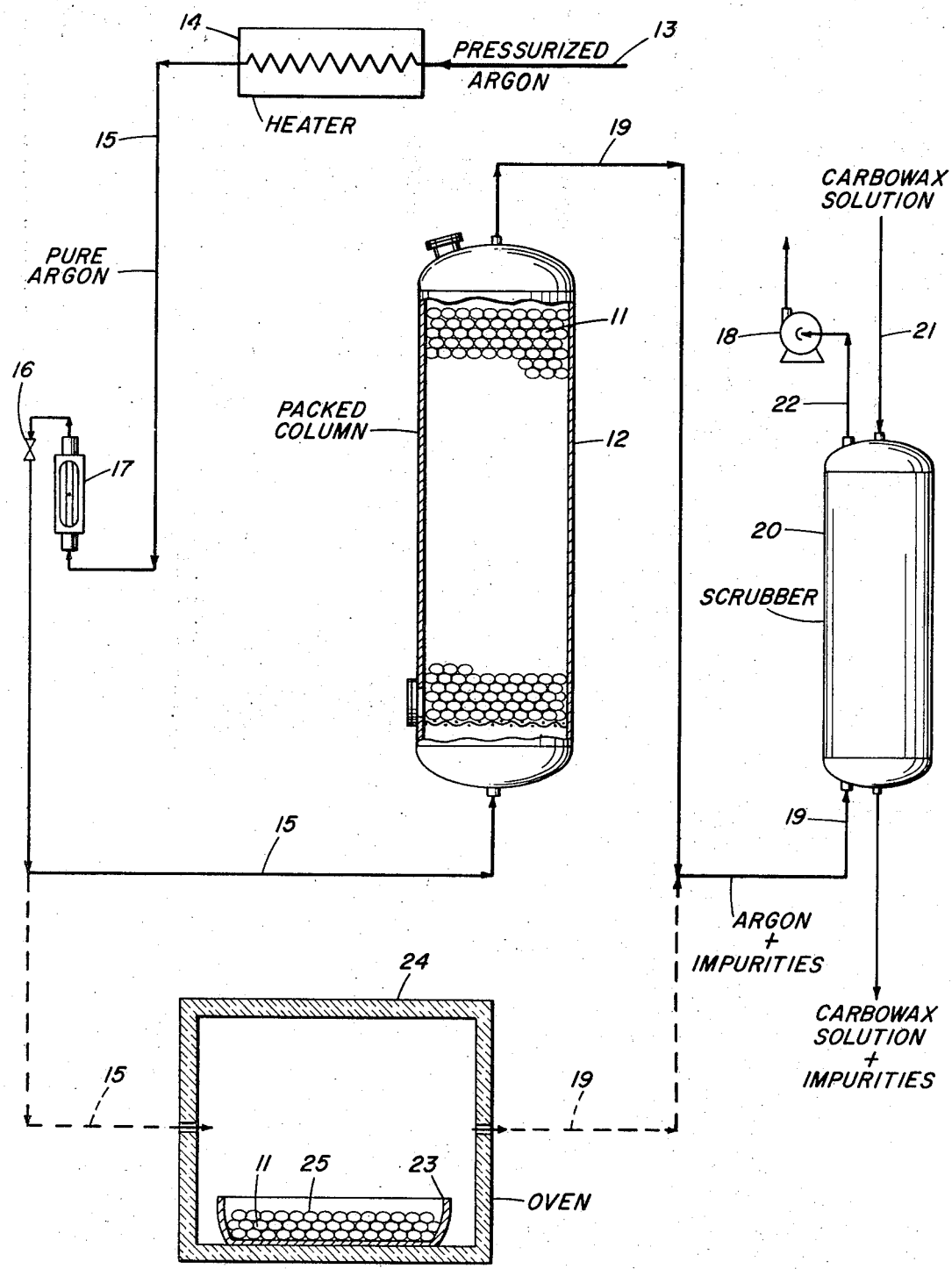

ABSTRACT OF THE DISCLOSURE

The crude high molecular weight polyglycolic acid required for use as an absorbable surgical suture sometimes contains substantial amounts of glycolide and other impurities. It has been discovered that the presence of such impurities significantly interferes with the extrusion and stretching characteristics of polyglycolic acid filaments and its satisfactory rate of absorption in living tissue. A novel kind of polyglycolic acid is provided which is substantially free from such impurities consequently having suitable extrusion and stretch properties as well as acceptable in-vivo strength retention. The novel polyglycolic acid is prepared by contacting particles of impurity laden polyglycolic acid with a flowing stream of a substantially dry, oxygen free, inert gas under controlled process conditions whereby the impurities are vaporized into the gas stream to effect their removal from the environment of the polyglycolic acid.

BACKGROUND OF THE INVENTION

Widespread research efforts have been directed towards development of synthetic absorbable sutures to replace the presently used catgut suture which is made from mammalian intestine. U.S. Pat. 3,297,033 describes such an absorbable suture prepared from polyglycolic acid. This patent indicates that for polyglycolic acid to be useful as a suture, it should have a molecular weight in the range of 10,000 or more. If low molecular weight polymer is used the suture prepared therefrom will have unsuitable package properties and in-vivo strength retention, if indeed a suitable filament can even be prepared. It is known that if such high molecular weight polyglycolic acid is required, the route by which it is prepared must be carefully selected from among the many available. The preferred route for preparing high molecular weight polyglycolic acid suitable for use as an absorbable suture is by the catalyzed polymerization of substantially pure glycolide such as disclosed, for example, in U.S. Pats. 3,297,033 and 2,668,162. Unfortunately, all of the glycolide monomer does not always polymerize and monomer contents as high as 8% have been observed in the polymer. Other impurities sometimes occur in the polymer to a lesser extent. Applicant has discovered that unless the monomer content and the level of other impurities in such polymer is substantially eliminated or at least greatly reduced that three problems are encountered in subsequent processing of the polymer:

(1) The polyglycolic acid is excessively plasticized by the unpolymerized glycolide to the point where it cannot be extruded satisfactorily into filaments, or (2) If it can be extruded, sometimes the filament cannot be stretched for orientation without breaking the filament, or (3) If the filament can be stretched, the filament produced is sometimes too weak for use as a suture and furthermore is too weak to withstand subsequent routine processing.

Therefore, in such circumstances the gloycolide must be removed from the polymer before extruding and stretching it. However, due to the unusual nature of polyglycolic acid, a problem arises in how this can be done while simultaneously preserving the desirable high molecular weight of the polymer. Melt devolatilization is not preferred since it necessitates holding the polymer in the molten state for long periods of time. Unfortunately polyglycolic acid is thermally unstable and will degrade to unsuitable low molecular weight polymer in a very short time if held at a very high temperature. A further problem occurs when polyglycolic acid is held at high temperatures for prolonged time intervals; polymer breakdown further occurs through chemical attack, i.e., glycolide reacts rapidly with even minute traces of water which often exist in the polymer melt. The product formed by the water-glycolide reaction is the linear dimer of glycolic acid as shown below:

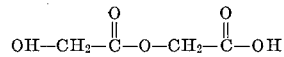

which in turn reacts with the polymer causing a reduction in the molecular weight of the polymer. The linear dimer of glycolic acid can also be produced during thermal degradation of the polymer.

Since the above undesirable effects occur most rapidly at the high temperatures at which the polymer is formed, it is essential, once polymerization has proceeded to an acceptable level, to cool the polymer as quickly as possible to minimize these reactions. Of course, in so doing, the polymer solidifies with the undesirable glycolide and other impurities still contained therein.

Applicant has now discovered a novel method for removing monomer and other impurities from solidified polyglycolic acid without the attendant risk of reducing the molecular weight of the polymer to an unsuitable level for use as an absorbable surgical suture.

SUMMARY OF THE INVENTION

This invention relates to a process for removing glycolide and other harmful vaporizable impurities from high molecular weight polyglycolic acid in the solid state whereby polyglycolic acid is produced which is extrudable and stretchable and eminently useful for the preparation of absorbable surgical sutures.

This invention also relates to the novel kind of polyglycolic acid which is produced by the above process, i.e. polyglycolic acid which is substantially free from vaporizable impurities.

A "vaporizable impurity" is one which can be volatilized from the polymer containing it and includes glycolide and other impurities.

Polyglycolic acid is substantially free from vaporizable impurities when it contains less than about 0.2% by weight of vaporizable impurities.

Polyglycolic acid is "extrudable" when it can be extruded into a continuous self-supporting strand or filament.

Polyglycolic acid is "stretchable" when it can be stretched without breaking to produce a filament which has a tenacity in excess of 4 grams/denier, a maximum tension during draw in excess of about 0.85 gram per denier, and an operating tension during draw in excess of about 0.7 grams per denier. Such a filament is at least moderately tough, has the capability of surviving at least average handling, and is of sufficient strength for use as an absorbable surgical suture.

Polyglycolic acid which is not treated in accordance with the process of this invention is generally either not extrudable or, if extrudable, not stretchable and hence too weak for use as an absorbable surgical suture.

Polyglycolic acid in the solid state which contains glycolide monomer and other impurities which adversely affect extrudability and stretchability can be rendered extrudable and stretchable in accordance with the process of this invention by contacting particles of the impurity laden polyglycolic acid with a flowing stream of a gas which is substantially non-reactive with polyglycolic acid and which further is substantially free from moisture and oxygen under the following conditions:

Gas temperature: 20 to 190° C.
Gas flow rate: .035 to 10 s.c.f.h. [1]/lb. of polymer
Pressure: 0.01 mm. Hg to 10 p.s.i.g.
Contact time: 4 to 180 hours

[1] Scfh=Standard cubic feet per hour.

whereby glycolide and other vaporizable impurities contained in the polymer are volatilized into the gas stream which then removes the impurities from the environment of the polymer.

The novel polyglycolic acid particles prepared by the process of this invention are extrudable and stretchable, and are further characterized by a weight loss less than about 0.2% when said particles are contacted with a flowing stream of substantially pure argon containing less than 100 p.p.m. moisture under the following conditions:

Argon temperature: 165° C.
Argon flow rate: .835 s.c.f.h./lb. of polymer
Pressure: 20 mm. Hg
Contact time: 17 hours The term "particle" as used herein refers to a piece of polyglycolic acid, in whatever manner formed, which is retained by a 50 mesh screen and which has no dimension thereof in excess of about 3/8 of an inch. The particle may be irregularly shaped or symmetrical.

BRIEF DESCRIPTION OF THE DRAWING

FIG. 1 is a schematic flow sheet showing two different embodiments of the process of this invention.

DESCRIPTION OF THE PREFERRED EMBODIMENTS

Among the gases which are suitable for use in the process of this invention are argon, nitrogen, carbon dioxide, helium, krypton, xenon, hydrogen, halogenated hydrocarbons containing one or more fluorine atoms such as dichlorodifluoromethane. A gas is substantially free from moisture and oxygen when it contains less than 100 p.p.m. water or oxygen. Preferably the gas will contain less than 10 p.p.m. each of moisture and oxygen. Argon is a preferred gas.

The temperatures of gas in contact with polymer should not exceed 190° C. in order to avoid thermally decomposing the polymer. On the other hand, the rate of polymer improvement is ponderously slow at gas temperatures below 20° C. Preferred gas temperatures are about 140 to 175° C. Preferred temperatures of the polymer itself are 90 to 165° C. When the process is run at subatmospheric pressures, the polymer usually remains at a somewhat lower temperature than that of the gas stream due to the combined effects of the reduced rate of heat transfer and the heat consumed by the impurities in the course of their vaporization.

The pressure employed is related to the flow rate used. To use higher pressures, higher flow rates are required. Flow rate, in turn, depends on the temperature selected. With higher temperatures, lower flow rates can be used and with lower temperatures, higher flow rates should be used. Preferred pressures are less than 40 mm. Hg. The preferred flow rates depend on the preferred temperatures (140 to 175°) and ordinarily range from 0.05 to 5 s.c.f.h. per pound of polymer.

Contact time is dependent on selection of the other process variables. For example, when low pressure and high temperature are used shorter contact times are permissible. Conversely when higher pressure and lower temperatures are used, longer contact times are required.

The particle size of the polyglycolic acid has an important bearing upon the success of the impurity removing process. If the particles are too large, the surface area of contact between gas and polymer will be insufficient to permit efficient removal of impurities. Generally particles having any dimension thereof in excess of 3/8 of an inch are unsuitable. On the other hand, if the particles are too fine, they are too unstable to handle in the presence of the normal atmospheric environment and will ordinarily irreversibly degrade before they can even be treated. To preclude this, polymer particles which pass through a 50 mesh screen should not be used.

A pellet shaped particle is highly preferred in order to keep the surface to volume relationship constant. A cylindrical pellet having a 1/16 inch diameter and a length of 1/16 to 1/8 inch is highly preferred.

Shown below are two highly preferred sets of process conditions. One set is for a "long term" process while the other set is for a "short term" process.

| | Short term | Long term |
|---|---|---|
| Gas temperature (° C.) | 165 | 165 |
| Gas flow rate (s.c.f.h./lb. polymer) | .42–1.76 | .042–.25 |
| Pressure (mm. Hg.) | 10–40 | (1) |
| Contact time (hours) | 15–20 | 40–150 |

[1] 2 or less.

The polymer particles may be contacted by the flowing gas in a variety of ways. For example, the gas can be blown through an agitated or fluidized bed of polymer, or through a rotating cylinder or tumbler which continually mixes and tubles the polymer through the hot gas stream. Similarly, the gas can be blown across the surface of a static bed of polymer or through a packed bed of polymer. An apparatus which provides for agitation or fluidization of the polymer in contact with the hot gas is preferred in order to minimize the problems of stagnation and non-uniformity which can result iwth static polymer systems.

A suitable method for carrying out the process is shown in FIG. 1. Referring to FIG. 1, polymer particles 11 are packed in tube 12 (shown in section). Pressurized argon 13 is directed through gas heater 14. The argon which has been preheated to the proper temperature 15 flows upwardly through particles 11 in tube 12, the argon flow rate being adjusted by value 16 and rotometer 17. The required pressure is established within tube 12 by use of vacuum system 18. As hot argon 15 contacts polymer 11, convective heat transfer occurs to heat up polymer 11, and the impurities contained therein vaporize into the argon stream and are swept away from the polymer by the flowing stream of argon. The impurity enriched argon stream 19 emerges from tube 12 and enters scrubber 20 wherein it is contacted with a non-aqueous liquid polymer (Carbowax) solution 21 which removes substantially all of the polymer impurities from the argon stream. The purified argon stream 22 is then removed from the system by vacuum system 18.

In cases where the interior surfaces of tube 12 are separately heated in any manner whatsoever, there will also be heat transfer to the polymer particles from surfaces by radiation and conduction.

The dotted lines in FIG. 1 represent a second embodiment of the process wherein polymer particles 11 are merely placed in pan 23 which is then inserted in oven 24 (shown in section). Pure pre-heated argon 15 sweeps across the surface 25 of the particle bed. The remainder of the process is the same as described above for the case when polymer particles 11 were packed in tube 12.

The following examples are provided to further illustrate the invention.

EXAMPLE 1

(1) Polymer devolatilization

A mass of polyglycolic acid as typically prepared in U.S. Pats. 3,297,033 or 2,668,162 is ground into particles using an Abbe mill (3 HP, 1750 r.p.m. electric motor, all internal parts of stainless steel).

An enamel pan is lined with aluminum foil and tared after which a one inch depth of ground dried polymer is charged to the pan. The pan is weighed and the net polymer weight determined. The pan is then placed in the oven. Heat and vacuum are applied to the oven to establish the required temperature and pressure therein. Argan which can be optionally pre-heated to the required gas temperature is admitted to the oven via a distribution manifold stretching across the width and height of the oven. A needle value at the argon inlet controls the argon flow rate. The argon emerging from the oven is directed to a scrubber containing a solution of Carbowax 550. This solution removes the impurities picked up from the polymer during passage of the argon through the oven. This step is desirable in order to prevent the impurities from fouling the vacuum system. The purified argon is then removed from the system by the vacuum pump.

Once the desired oven conditions, argon temperature and flow rate have been established, these conditions are maintained for the prescribed treatment time after which the devolatilized polymer is removed from the oven and stored under dry conditions until extruded.

(2) Polymer extrusion

The devolatilized polymer is then extruded into a multi-filament using conventional extrusion equipment and techniques. The extruded fiber is collected on a take-up reel and subsequently stretched using standard equipment and techniques.

Data are presented below in Table I which compare polymer not subject to the process of the invention with polymer treated under two different sets of conditions which fall within this invention.

It is apparent from the above data that polymer not treated by the process of this invention resulted in a fiber having properties which are unsuitable for use as an absorbable suture while the two samples treated in accordance with the inventive process were extrudable and streatchable and, therefore, suitable for use as an absorbable suture.

EXAMPLE 2

In a manner similar to that shown in Example 1, extrudable and stretchable polyglycolic acid filaments which were suitable for use as absorbable surgical sutures were prepared from polymer which was treated in accordance with the process of this invention under the conditions shown below in Table II.

TABLE II

| Gas temp. (° C.) | Contact time (hr.) | Pressure (mm. Hg.) | Gas flow rate (s.c.f.h./lb. polymer) | Percent glycolide Initial | Percent glycolide Final | Melt flow rate Initial | Melt flow rate Final | Percent weight loss |
|---|---|---|---|---|---|---|---|---|
| 163 | 118 | .05 | .24 | 1.6 | .2 | 1.48 | 1.68 | 2.7 |
| 155 | 14 | 100 | .93 | | | .76 | .62 | 2.23 |
| 155 | 14 | 30 | 2.62 | | | .64 | .34 | 2.05 |
| 155 | 20 | 37 | 1.9 | | | .96 | .58 | |
| 132 | 48 | .5-5 | .11 | | | | | 1.6 |
| 100 / 150 | 10 / 9 | 25 | 8.3 | | | 1.35 | .097 | 3.18 |

I claim:

1. A process for producing polyglycolic acid in particle form which is extrudable and stretchable to yield filaments of sufficient strength for use as an absorbable surgical suture which comprises contacting particles of polyglycolic acid which contain vaporizable impurities with a flowing stream of a gas which is substantially non-reactive with said polyglycolic acid particles and which further is substantially free from moisture and oxygen under the following conditions:

Gas temperature: 20 to 190° C.
Gas flow rate: .035 to 10 s.c.f.h./lb. of polymer
Absolute pressure: .01 mm. Hg to 10 p.s.i.g.
Contact time: 4 to 180 hours whereby vaporizable impurities contained in said polyglycolic acid vaporize into said gas stream to be thereby swept away from the environment of the polyglycolic acid particles.

2. The process of claim 1 wherein the conditions are as follows:

Gas temperature: 140 to 175° C.
Absolute pressure: .01 to 40 mm. Hg

3. The process of claim 2 wherein the conditions are as follows:

Gas temperature: 160 to 170° C.
Gas flow rate: .42 to 1.67 s.c.f.h./lb. of polymer
Absolute pressure: 10 to 40 mm. Hg
Contact time: 15 to 20 hours 4. The process of claim 2 wherein the conditions are as follows:

Gas temperature: 160 to 170° C.
Gas flow rate: .042 to .25 s.c.f.h./lb. of polymer
Absolute pressure: 2 mm. Hg or less
Contact time: 40 to 150 hours 5. The process of claim 4 wherein said gas is argon.

TABLE I

| Process conditions | | | | Polymer characteristics | | Extrusion head pressure (p.s.i.g.) | Stretching conditions | | | | Properties of stretched fiber | | |
|---|---|---|---|---|---|---|---|---|---|---|---|---|---|
| Gas temp. (° C.) | Pressure (mm. Hg) | Gas flow (s.c.f.h./lb. polymer) | Contact time (hr.) | Melt flow rate [1] | Percent volatiles removed | | Maximum tension during draw (gm./denier) | Operating tension during draw (gm./denier) | Overall stretch | Stretch characteristic | Denier | Tenacity (gm./denier) | Percent elongation |
| As is (control) | | | | 1.08 | | 2,750 | .535 | .242 | 3.9x | Very poor | Too many broken filaments to test | | |
| 155 | 2.5 | .48 | 118 | | 3.0 | 3,500 | 1.25 | .734 | 4.3x | Good | 99 | 4.6 | 22 |
| 155 | 30 | 3.0 | 15 | .67 | 1.88 | 5,800 | 2.69 | 1.92 | 4.4x | ....do.... | 95 | 6.8 | 12.5 |

[1] By ASTM designation D-1238-65T, modified using a 35 mil orifice.

6. The process of claim 2 wherein said gas flows through a packed bed of polyglycolic acid particles.

7. The process of claim 2 wherein said gas flows through a non-static bed of polyglycolic acid particles.

8. The process of claim 5 wherein said gas is argon.

9. The product of the process of claim 2.

References Cited

UNITED STATES PATENTS

| | | | |
|---|---|---|---|
| 3,047,565 | 7/1962 | Braun et al. | 260—239.3 |
| 3,297,033 | 1/1967 | Schmitt et al. | 128—335.5 |
| 3,344,091 | 9/1967 | Russin et al. | 260—2.3 |
| 3,422,181 | 1/1969 | Chirgwin | 264—345 |
| 3,440,225 | 4/1969 | Suttler et al. | 260—78.3 |
| 3,468,853 | 9/1969 | Schmitt et al. | 260—78.3 |

WILLIAM H. SHORT, Primary Examiner

E. A. NIELSEN, Assistant Examiner

U.S. Cl. X.R.

264—176, 210

UNITED STATES PATENT OFFICE
CERTIFICATE OF CORRECTION

Patent No. 3,565,869          Dated February 23, 1971

Inventor(s) David A. DeProspero

It is certified that error appears in the above-identified patent and that said Letters Patent are hereby corrected as shown below:

Line 42, Column 4 under "Short term" -"42-1.76,"

should be "42-1.67".

Line 51, Column 4 - "continually mixes and tubles" - should be "continually mixes and tumbles".

Signed and sealed this 6th day of July 1971.

(SEAL)
Attest:

EDWARD M. FLETCHER, JR.
Attesting Officer

WILLIAM E. SCHUYLER, JR.
Commissioner of Patents

Disclaimer and Dedication

3,565,869.—*David Anthony DeProspero*, Norwalk, Conn. EXTRUDABLE AND STRETCHABLE POLYGLYCOLIC ACID AND PROCESS FOR PREPARING SAME. Patent dated Feb. 23, 1971. Disclaimer filed Oct. 31, 1977, by the assignee, *American Cyanamid Company*.

Hereby disclaims and dedicates to the Public the entire remaining term of said patent.

[*Official Gazette March 21, 1978.*]